United States Patent
Proctor, Jr.

[11] 3,733,889
[45] May 22, 1973

[54] REFERENCE MARKER FOR NONDESTRUCTIVE INSPECTION TECHNIQUES

[75] Inventor: Edward S. Proctor, Jr., Chattanooga, Tenn.

[73] Assignee: Combustion Engineering, Inc., Windsor, Conn.

[22] Filed: Aug. 26, 1970

[21] Appl. No.: 67,152

[52] U.S. Cl. ................................................ 73/67.5
[51] Int. Cl. .................................................. G01n 29/00
[58] Field of Search ............................ 73/67.7, 67.8

[56] References Cited

UNITED STATES PATENTS

| | | |
|---|---|---|
| 2,838,930 | 6/1958 | Krautkramer et al. .................. 73/67.8 |
| 2,645,933 | 7/1953 | Arenberg ............................. 73/67.8 |
| 3,056,284 | 10/1962 | Marsh et al. ......................... 73/67.8 |
| R23,090 | 3/1949 | Firestone ............................. 73/67.8 |

*Primary Examiner*—Richard C. Queisser
*Assistant Examiner*—Arthur E. Korkosz
*Attorney*—Eldon H. Luther, Robert L. Olson, John F. Carney, Richard H. Berneike

[57] ABSTRACT

A reference marker for use in conjunction with volumetric inspection techniques on nuclear reactor pressure vessels. A block of material having a sharp corner geometry is provided at particular locations on the vessel structure to be inspected. The block of material then serves as a physical location reference marker and/or means for use in calibration of the volumetric inspection device.

4 Claims, 2 Drawing Figures

PATENTED MAY 22 1973

3,733,889

INVENTOR.
E. S. PROCTOR
BY Lawrence P. Kessler
ATTORNEY

REFERENCE MARKER FOR NONDESTRUCTIVE INSPECTION TECHNIQUES

BACKGROUND OF THE INVENTION

Present day testing codes require thorough inspection of materials used in constructing anything which may effect health or safety. One testing technique used to inspect thick materials is volumetric inspection which involves the "looking through" the structure by radiographic or ultrasonic techniques to detect the condition thereof. Volumetric inspection, for example, is required in the inspecting of plates used in pressure vessels and the weld areas therebetween.

Testing codes for pressure vessels, and in particular nuclear steam supply system pressure vessels, further require volumetric inspection at specific time intervals during the vessel life. Testing procedures must be uniform and repeatable to yield an accurate picture of the environmental effect on the pressure vessel and weld structure. Since any part of a structure has different characteristics, even from point to point thereon, it is necessary to make the periodic tests at identical locations so as to give an accurate picture of the effect of the environment on that particular structural area.

SUMMARY OF THE INVENTION

It is the purpose of this invention to provide a conveniently locatable physical landmark to enable examination and inspection, particularly of the volumetric type, to be accomplished at identical points on a nuclear reactor pressure vessel structure. A block of material having sharp corner geometry is provided at a particular location on the vessel structure to be inspected. The block material then serves as a reference marker to enable repeatable testing at that particular location. Additionally, the particularly known characteristics of the reference marker will enable calibration of a volumetric inspection device to give accurately repeatable test data on subsequent testing.

DESCRIPTION OF THE PREFERRED EMBODIMENT

Figure 1:
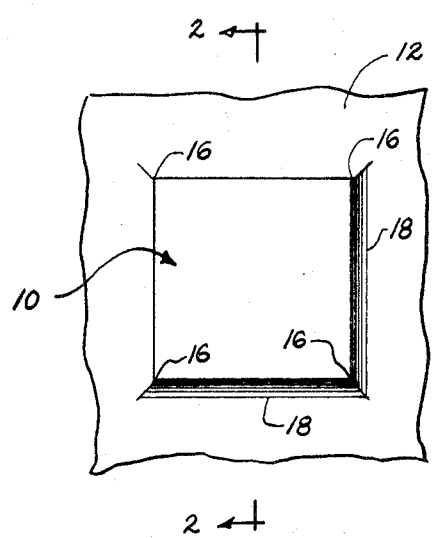
FIG. 1 is a view of the reference marker according to this invention.
Figure 2:
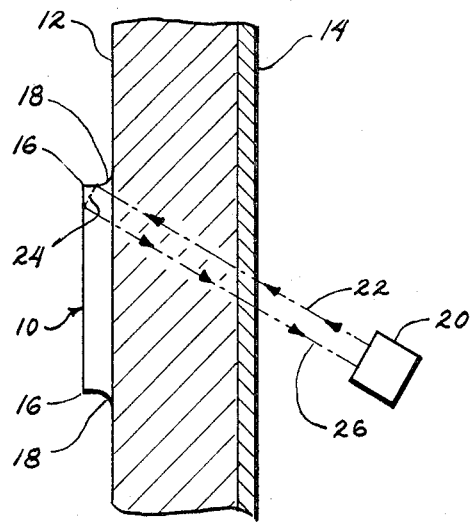
FIG. 2 is a sectional view of the reference marker of FIG. 1 taken along line 2—2 of FIG. 1.

Referring now to the drawings, the reference marker consists of a block of material 10 located on the surface of the structure 12 to be tested. In the embodiment shown, structure 12 represents the wall of a nuclear reactor pressure vessel having a cladding surface 14 on the inside thereof. The block of material 10 is preferably a buildup of weld material formed on the vessel structure 12 at predetermined locations (such as adjacent weld seams or any other desired area of inspection). After the weld material has been built up on the vessel structure 12, it is machined to give it a specific geometry having a rectangular configuration consisting of sharp corners 16 (all outside edges intersecting at 90° angles) with a small fillet radius 18 at the intersection of the material 10 and the pressure vessel wall structure 12.

The reference marker block of material 10 may then be used to serve as a physical landmark and/or means for use in calibration of a volumetric inspection device in the following manner. A volumetric inspection device such as an ultrasonic transducer crystal 20 is passed on that side of the vessel structure 12 which is opposite the side on which the block 10 is located, the crystal 20 emitting an ultrasonic pulsed signal 22. The sharp corner geometry of the reference marker block 10 provides an echo path 24, 26 off of the corner 16 for the emitted signal 22 to reflect the signal 22 back to the crystal 20 so that a physical landmark may be established on the surface of the structure 12 to be inspected for repeatable testing. The crystal 20 could alternatively be mounted outside the structure 12 and have the signal therefrom reflected off the inside wall to the corner 16 of the block 10. It is noted that the fillet radius 18 must be kept small compared to the height of the intersecting wall to provide an adequate ultrasonic reflection surface. A plurality of reference marker blocks may be placed on the structure to be inspected to form an established grid network of inspection areas to be tested.

Additionally, the reference marker block 10 may be used as a calibration block for more accurate ultrasonic crystal calibration. With the use of the block 10, more accurate calibration is achieved by applying the signal to be calibrated to the actual vessel structure that is to be tested in order to establish the characteristics of the volumetric inspection device on that particular structural location. Effects such as crud deposit buildups, radiation effects and grain size of the vessel structure to be tested may thus be accurately accounted for, which would not be possible if a standard calibration block were used. This enables accurately repeatable test data to be generated to establish the effect of the environment on the vessel structure 12 being tested.

From the foregoing, it is apparent that by providing a buildup of material having a sharp corner geometry directly to a nuclear reactor pressure vessel structure to be tested by volumetric inspection techniques it is possible to establish a convenient physical landmark on that vessel structure. These landmarks provide for accurate repeatable testing of the vessel structure at particular selected points and further enables the volumetric inspection device to be more accurately calibrated than would be possible using standard calibration blocks.

While this preferred embodiment of the invention has been shown and described, it will be understood that it is merely illustrative and that changes may be made without departing from the scope of the invention as claimed.

What is claimed is:

1. A reference marker for providing a reference point on a wall of a pressure vessel subject to examination by a nondestructive material inspection device, said reference marker comprising a block of material permanently affixed to said wall to be inspected at a particular location on one side thereof, said block being machined to a geometry having a rectangular configuration consisting of sharp corners, the outside edges of the rectangular configuration intersecting at 90° angles, and a fillet radius at the intersection of the block material and said wall, and wherein said nondestructive material inspection device includes an ultrasonic transducer crystal located on the opposite side of said wall from said block material which emits pulsed ultrasonic signals which travel through said wall to said block material and are reflected back through said wall to said crystal when said signals intercept the sharp corners of said block material.

2. The reference marker of claim 1 wherein said block of material consists of weld material built up on the surface of one side of said wall to be inspected.

3. The reference marker of claim 2 wherein said fillet radius is small as compared to the height of the intersecting wall of said reference marker so as to provide an adequate reflective surface for said ultrasonic transducer crystal pulsed signal.

4. In combination, a wall of a pressure vessel, a nondestructive material inspection device for examining said wall of said pressure vessel, and a reference marker for providing a reference point on said wall, said reference marker comprising a block of material permanently affixed to said wall to be examined at a particular location on one side thereof, said block material being machined to a geometry having a rectangular configuration consisting of sharp corners, the outside edges of the rectangular configuration intersecting at 90° angles, and a fillet radius at the intersection of the block material and said wall, and said nondestructive material inspection device comprising an ultrasonic transducer crystal located on the opposite side of said wall from said block material which emits pulsed ultrasonic signal which travel through said wall to said block material whereby when said pulsed ultrasonic signals traveling through said wall intercept the sharp corners of said block material permanently affixed to said wall, said signals are reflected back through said wall to said crystal.

* * * * *